United States Patent [19]

Dragner et al.

[11] Patent Number: 5,492,600
[45] Date of Patent: Feb. 20, 1996

[54] METHOD OF ENHANCING THE OPACITY OF PAPER AND PAPER PRODUCE THEREOF

[75] Inventors: Louis R. Dragner; Bernard F. North, both of Rock Hill, S.C.

[73] Assignee: Sequa Chemicals, Inc., Chester, S.C.

[21] Appl. No.: 438,750

[22] Filed: May 10, 1995

Related U.S. Application Data

[62] Division of Ser. No. 229,466, Apr. 18, 1994.

[51] Int. Cl.$^6$ .......................... D21H 17/07; D21H 17/04; D21H 17/14; D21H 17/16
[52] U.S. Cl. .................... 162/164.1; 162/164.2; 162/179; 162/180; 162/164.6
[58] Field of Search ........................... 162/179, 180, 162/164.5, 158, 164.1, 164.2

[56] References Cited

U.S. PATENT DOCUMENTS

| | | | |
|---|---|---|---|
| 2,142,986 | 1/1939 | Arnold, Jr. ............................ | 162/172 |
| 3,014,836 | 12/1961 | Proctor, Jr. ........................... | 162/181.8 |
| 3,096,232 | 7/1963 | Chapman .............................. | 162/172 |
| 3,251,732 | 5/1966 | Aldrich ................................. | 162/179 |
| 3,427,219 | 2/1969 | Bonzagni .............................. | 162/168.5 |
| 3,445,330 | 5/1969 | Kulick et al. ........................ | 162/164.2 |
| 3,932,210 | 1/1976 | Suzaki et al. ........................ | 162/157 |
| 4,425,186 | 1/1984 | May et al. ............................ | 162/158 |
| 4,826,536 | 5/1989 | Raythatha et al. ................... | 106/465 |
| 4,877,539 | 10/1989 | Ploog et al. .......................... | 252/8.8 |
| 5,292,363 | 3/1994 | Hutcheson ............................ | 106/243 |
| 5,296,024 | 3/1994 | Hutcheson ............................ | 106/243 |

*Primary Examiner*—David L. Lacey
*Assistant Examiner*—Jose A. Fortuna
*Attorney, Agent, or Firm*—Mitchell D. Bittman

[57] ABSTRACT

A method of enhancing the opacity of paper and paper of enhanced opaqueness is provide wherein a reaction product of fatty acid, diamine and rosin acid and further including a surfactant is added to an slurry of cellulose fibers in the papermaking process.

20 Claims, No Drawings

METHOD OF ENHANCING THE OPACITY OF PAPER AND PAPER PRODUCE THEREOF

This is a division, of application Ser. No. 08/229,446, filed Apr. 18, 1994.

FIELD OF THE INVENTION

This invention relates to compositions tbr use in the papermaking process, a papermaking process employing the compositions to add opaqueness to the paper, and a paper produced using the compositions.

BACKGROUND OF THE INVENTION

The quality of paper produced from cellulose fibers (i.e. wood pulp or the paper produced by the recycling of such paper) is often judged by its opacity. Paper producers have long sought to improve opacity so that an enhanced paper may be obtained.

This and other desired characteristics have been obtained in the past by supplying the pulp slurry of cellulose fibers or furnish with additives prior to the slurry entering the papermaking machine. Various additives are well known in the art. For example, titanium dioxide powder is known to be an excellent whitener. Titanium dioxide, however, is among the most expensive materials that may be added to the slurry. Thus, despite the effectiveness of such material as a brightener, its use is limited and satisfactory replacements have been needed.

Kaolin clay has also been used as a filler in paper to improve brightness in the ultimate product. Generally, the kaolm clay is calcined and then suspended in an aqueous solution prior to being added to the furnish. The clay must be continuously agitated prior to entering the slurry or the solid particles begin to form sediment at the bottoms of the clay holding tanks. Although kaolin clay provides brightness, as well as opacity to the finished paper product, the relative difficulty of adding it to the slurry is a drawback.

When clay is added to the pulp slurry, the slurry needs additional chemicals. A retention aid is necessary to retain the clay in the sheet which will add extra cost to the sheet. Adding clay to the slurry will also have an adverse effect on drying the sheet of paper. The paper maker will slow the paper machine down to maximize the drying to make sure the sheet is dried which will increase the cost of the sheet. The clay also increases wear on the paper machine. This wear shows up in shorter life for some of the parts of the paper machine. The wire, felt, doctor blade and refiners especially, show wear when clay is used. With the increased abrasiveness of the clay down time is longer and more frequent. Such kaolin-containing products are described in U.S. Pat. Nos. 3,014,836 to Proctor, Jr. and 4,826,536 to Raythatha et al.

Hydrated aluminum silicate has also been employed as a clay substitute in the papermaking process. It has properties similar to kaolin clay and, thus, results in the same disadvantages when used to make paper.

Many compositions have been added to the slurry in an attempt to size the paper, i.e. add body to the paper and render the paper water repellent or waterproof. Most know sizes, such as those disclosed in U.S. Pat. No. 2,142,986 to Arnold, Jr. and U.S. Pat. No. 3,096,232 to Chapman, employ a type of wax. For example, Arnold, Jr. discloses that an emulsion of wax in a solution of deacetylated chitin, paraffin waxes, Japan wax, carnauba wax, higher aliphatic alcohols, or synthetic waxes may be employed as the waterproofing agent in a sizing composition. A softening agent such as aliphatic alcohols containing 12 to 20 carbons is also present in the composition of Arnold, Jr. Chapman discloses the use of paraffin waxes or water-insoluble derivatives of resins for producing aqueous wax emulsions with cationic modified starches.

In U.S. Pat. Nos. 5,296,024 and 5,296,363 a papermaking composition is disclosed for enhancing opaqueness comprising the reaction product of fatty acid and aliamine. This composition is effective although it tends to decrease the coefficient of friction of the paper produced which can present difficulties in certain papermaking processes.

SUMMARY OF THE INVENTION

It is an object of the present invention to provide a composition for adding to paper during the papermaking process so that the resulting paper has enhanced characteristics.

It is another object of the present invention to provide a composition that adds opacity to paper to which it is added.

Another object of the present invention is to provide a composition for opacifying a paper without significantly decreasing the coefficient of friction or brightness of the paper produced.

Still another object of the present invention is to provide a process for adding a composition to pulp slurry of cellulosic fibers in the papermaking process that will result in a paper having enhanced opacity.

Yet another object of the present invention is to provide a paper having the desirable characteristics of enhanced opacity.

Generally speaking, the present invention is directed to a composition used as an additive to the pulp slurry of cellulose fibers from which paper is formed. the process of making paper from the additive-containing slurry, and the paper made according to that process. The composition contains the reaction products of fatty acid, diamine and rosin acid, wherein the composition further includes a surfactant. In addition the following may be added to the composition: an acid to adjust pH, a salt to adjust viscosity, and or a defoamer to control foam.

DETAILED DESCRIPTION OF THE INVENTION

The composition of this invention is added to the pulp slurry after the wood pulp has been bleached to remove lignin and other undesirables and deinked, if recycled paper pulp is being used, but before the pulp enters into the headbox of a papermaking machine. The composition may be added alone, or in conjunction with other brighteners, opacifying agents. and sizes. For example, in one embodiment of the invention, the composition hereof may be added in conjunction with papermaking clays such as kaolin or in conjunction with a brightness and opacifying agent based on the stearic acid diamide of amino ethyl ethanolamine.

The composition may be added to any pulp slurry of cellulose fibers to obtain the desired physical characteristics and is especially useful for enhancing the characteristics of paper made from the recycled pulp of cellulose fibers. The amount of composition, as well as the amounts of each component in the composition, will vary depending on the characteristics and types of pulp slurry to which the composition is added. As is well known, different sources of wood pulp have different peculiarities that attribute to their ability to be brightened, made more opaque and more water resistant, and easily processed. For instance, some wood pulp requires a higher concentration of brightening and opacifying agents than others to produce a finished paper product having identical characteristics.

The composition employed in the present invention comprises the reaction products formed from the reaction of fatty acid, diamine and rosin acid and wherein the composition further includes a surfactant. This composition provides an increase in opacity to the paper produced and an increase in the slip angle of the paper (increase in the coefficient of friction) as compared to a reaction product of fatty acids and diamines where no rosin acid is incorporated.

The fatty acid utilized in the composition preferably is a long chain fatty acid having between 12 and 18 carbons. Suitable fatty acids include lauric acid, myristic acid, isostearic and palmitic acid with the preferred acid being stearic acid. The fatty acids can also include the hydroxy substituted and/or the unsaturated fatty acids including ficinoleic acid, oleic acid, linoleic acid, linolenic acid and eleosteafic acid.

The diamine utilized in the composition is preferably an alkanoldiamine, preferably amino ethyl ethanol amine. Other suitable aliamines include amino propyl ethanol amine, amino ethyl propanol amine and amino propyl propanol amine. The diamine preferably has an amine number of less than 2000 mg KOH/gm and a boiling point greater than 120° C.

The rosin acid can be any commercially available source such as tall oil rosin, gum rosin, etc. The rosin contains abietic acid or its isomers and the rosin should have an acid number of at least 140 mg KOH/gm, preferably at least 160 mg of KOH per gm of sample. The rosin generally has a melting point of at least 65° C. and preferably above 70° C. The rosin acid when reacted with the fatty acid and alkanoldiamine has been found to increase the coefficient of friction (CoF) over a composition prepared by reacting fatty acid with alkanoldiamine. An increase in the CoF can be advantageous in certain papermaking processes and paper products.

The composition generally comprises 40 to 80%, preferably 50 to 76%, by weight of fatty acid, 5 to 30%, preferably 10 to 26%, by weight of rosin acid and 15 to 30%, preferably 18 to 21%, by weight of alkanoldiamine.

The composition can be prepared as follows. Stearic acid and rosin acid are charged to a resin flask equipped with an agitator, nitrogen sparge tube and a thermometer. The mixture of acids is heated to less than 150° C., preferably not exceeding 130° C. After a homogeneous solution is achieved the amino ethyl ethanol amine is added slowly with an addition funnel at a temperature not exceeding 150° C. The mixture of the acid and amine will exotherm. This exotherm can be controlled by external cooling or by the rate of addition of the amine. After the amine charge is completed the batch temperature is slowly increased to 180° C. to 230° C. The reaction will foam when the water of reaction starts to distill at 150° C. This foaming may be controlled by an anti foam agent. The acid value is measured when the temperature is at 180° C. to 200° C. If the acid value is less than 7 mg KOH/gm of sample, then batch can be cooled, if the acid value is greater than 7 cooking is continued until an acid value of less than 7 is achieved.

It is preferred that the particle size of the opacifier composition base be as small as possible. The reaction product made according to Example 1 herein is a hard solid substance. In order for the composition to remain in an emulsified state as in the composition described herein, intense agitation and heating is required. Moreover, it is highly desirable that the papers produced according to the present invention have substantially uniform brightness, opaqueness and sizing over its entire surface. Smaller particle sizes aid in the dispersibility of the particles within the slurry so that the desired characteristics are uniform throughout the paper. These smaller particle sizes may be obtained by either homogenizing the product in a high speed mixer or by rapidly cooling the composition from the high temperature at which the reaction product is formed as described herein.

A preferred suffactant used in the present invention is an ethoxylated surfactant such as POE (15) tallow amine. The surfactant further contributes to the desired dispersability of the reaction product in the water emulsion. If the amount of surfactant added is excessive, the sizing capability of the composition will be adversely affected. In the absence of a surfactant, the paper may be of a poor quality due to the decreased dispersibility of the composition, which results in spots or specks on the paper indicating a lack of dispersiblity. The surfactant which is added to the composition can be any of the fatty amine ethylene oxide adducts available commercially, including tallow amine with between 2 moles to 25 moles of ethylene oxide, stearyl amine with 2 to 25 moles of ethylene oxide and coconut amine with 2 to 25 moles of ethylene oxide. The surfactant can be combinations of any of the above or mixtures of the above with nonionic surfactants. To prepare the emulsion a kettle equipped with an agitator and thermometer, is charged with water followed by acid, surfactant, and salt. The reaction product is charged next. The mixture is heated to 75° C. to 98° C. and held for 30 minutes. The milky emulsion is cooled and the pH and solids are checked.

This composition has been found to impart increased opacity to the resultant paper without significantly decreasing the coefficient of friction or brightness of the paper produced. The composition is generally added to the pulp of cellulose fibers at a level of 0.05% to 5% by weight d/d (dry on dry), preferably 0.1 to 2% by weight d/d on the cellulose fiber.

The make-up of the composition may be varied depending on the origin of cellulose fibers from which the pulp slurry is made. In addition, the use of pulp which has been recycled from papers may require other adjustments to the composition, particularly when the recycled pulp is dark or otherwise discolored. All such adjustments to the composition may be easily made by one of ordinary skill in the art according to the invention disclosed herein.

The pulp to which the composition is added is made into a slurry using conventional techniques. The pulp may be bleached to remove unwanted pollutants such as lignins and de-inked if pulp made from recycled paper is used. The slurry is stored in holding tanks or fed to a papermaking machine, such as a Fourdrinier machine, in a conventional manner. The papermaking composition disclosed herein may be added either to the slurry when it is in the holding tank or may be added to the slurry as it moves along to the headbox of the papermaking machine. Preferably, the composition is applied onto the flowing pulp as it travels to the headbox.

When the slurry containing the composition reaches the headbox of the papermaking machine, paper is formed therefrom using conventional papermaking techniques and materials. The paper produced according to the present invention exhibits excellent characteristics of opaqueness, without significantly decreasing brightness or the coefficient of friction.

Moreover, the addition of the composition to the pulp slurry does not cause substantial negative effects on the slurry's movement through the papermaking process. Not decreasing the coefficient of friction is important as low coefficient of friction can cause crepe wrinkling and winder problems. Registration problems may also be caused on the printing press by a low coefficient of friction.

In a further embodiment of the present invention, other materials may be added in conjunction with the composition. For instance, the invention composition may be in addition to the kaolin clay so that the paper made therefrom exhibits increased opaqueness, and improved lubricity. Other additives which are well known in the art may also be added in conjunction with the composition disclosed herein.

The composition preferably contains a weak acid to adjust the pH. The acid maintains an acidic pH preferably within the range of from about 3 to about 6. The acid acts as an aid to disperse the composition. Weak organic acids such as acetic acid or formic acid are especially preferred in the composition. Strong acids, of course, may be used to control the pH, but corrosion and safety considerations may restrict their use.

Preferably, a viscosity controlling agent such as a salt is added during production of the papermaking composition. Generally, the sodium salts and chloride salts are known viscosity controlling agents including sodium acetate, potassium acetate, sodium propionate, potassium propionate, sodium chloride, and potassium chloride. Preferred salts include sodium acetate and sodium chloride. This component acts to reduce viscosity. The composition may further comprise a defoamer to control foam, and a biocide to control bacterial growth.

The present invention may be better understood by reference to the following examples.

EXAMPLE 1

The sample #1 was prepared by charging stearic acid and tall oil rosin into a reaction flask. The tall oil rosin had an acid number of 170 mg of KOH/gm of sample. The mixture was melted out under a nitrogen blanket to a temperature of 130° C. The molten acid was cooled to 100° C. and amino ethyl ethanol amine (AEEA) was added slowly. During the addition the temperature increased to 130° C. After the addition the temperature was increased to 230° C. with the water of reaction collected. At 230° C., a sample was taken and the acid value measured. It was 4.0 mg of KOH per gm of sample, so the batch was cooled and poured into a container. The final product was a light green solid with an acid number of 3.7 and amine number of 76.8.

The cooled reaction product base (33 grams) was added to 264 grams of water in a reaction flask. The flask also contained 6 grams of 84 % acetic acid, 0.5 grams of 25% sodium hydroxide, and 1 gram of tallow amine with 15 moles of ethylene oxide. The mixture was heated to 95° C. for 30 minutes. The milky emulsion was cooled to 40° C. and a sample taken. The sample had a pH of 4 and 11% non-volatile solids.

Samples #2–7 were prepared by charging stearic acid and tall oil rosin acid to a rosin kettle. The tall oil rosin had an acid number of 170 mg of KOH/gm. The kettle was heated to 100° C. under a nitrogen blanket. To the acid mixture, amino ethyl ethanol amine (AEEA) was added over a 20 to 30 minute period. During the AEEA addition the batch exothermed from 100° C. to 130° C. After the addition was complete, the batch was slowly heated to 200° C. One hour after the temperature reached 200° C. an acid value and amine value was measured. The batch was cooled down.

The above prepared samples contained the following components and properties:

| SAMPLE | Control | #1 | #2 | #3 | #4 | #5 | #6 | #7 |
| --- | --- | --- | --- | --- | --- | --- | --- | --- |
| Components (gms) | | | | | | | | |
| Stearic Acid | 479 | 299 | 381 | 343 | 323 | 300 | 272 | 254 |
| Tall Oil Rosin | 0 | 101 | 29 | 62 | 80 | 101 | 125 | 141 |
| AEEA | 100 | 100 | 90 | 95 | 97 | 99 | 103 | 105 |
| % Rosin | 0 | 20.3 | 5.8 | 12.5 | 16.1 | 20.3 | 25.0 | 28.2 |
| Properties | | | | | | | | |
| Acid Number | 3.5 | 3.7 | 2.8 | 2.5 | 2.9 | 5.4 | 6.3 | 7.0 |
| Amine Number | 40 | 76.8 | 55 | 66 | 73 | 73 | 80 | 76 |
| Melting Point (°C.) | 70 | 58 | 66 | 66 | 58 | 58 | 55 | 55 |

The 15 grams of each base were charged to reaction flask containing 80 grams of water, 0.35 grams of a TAM 15 POE surfactant, 2.7 grams of 84% acetic acid, and 0.34 grams of sodium acetate. The mixture was heated to 90° C., to make milky white emulsion. The finished product had about 15% nonvolatile solids and a pH of about 4.2.

A control was prepared by reacting stearic acid and AEEA as disclosed for Sample #1, but without the addition of tall oil rosin acid (pursuant to U.S. Pat. No. 5,296,024). The control base was then emulsified as disclosed for Sample #1, the emulsion having a pH of 4.3 and 10% non-volatile solids.

The above samples were added to 100% recycled pulp at two levels 40# and 80# per ton. The pulp slurry was added to a lab head box and drained. The wet sheet on the formation wire was dried at 250° F. for 3 minutes. The hand sheets were tested as follows: T-452 brightness and T-5 19 opacity were measured on a Technobnte instrument with the average of five readings being taken; the Mullen-Burst test measuring strength were run according to TAPPI standard T403 OM-85; the Scott Bond internal bond strength was measured on a Scott Bond tester; the water drop test measured water resistance on the hand sheet (time taken for a drop of distilled water to dissipate). The coefficient of friction (CoF) was measured by a slide angle tester Model TMI 3225.

The hand sheets were tested with the following results:

| | 40# of sample per ton of pulp | | | | | | | |
| --- | --- | --- | --- | --- | --- | --- | --- | --- |
| Example # | Blank | Control | 1 | 2 | 3 | 4 | 5 | 6 | 7 |
| Brightness | 57.8 | 58.3 | 57.3 | 57.7 | 57.7 | 57.3 | 57.6 | 57 | 57.2 |
| Opacity-T | 86.6 | 88.6 | 88.2 | 88.9 | 90.3 | 89.6 | 88.1 | 89.3 | 88.8 |
| Water Drop | 14 | 40 | 10 | 180 | 120 | 10 | 17 | 13 | 15 |
| Mullins Burst | 5 | 3.3 | 3.5 | 3.5 | 3.8 | 4 | 3.7 | 4 | 4.2 |
| Scott Bond | 40 | 33 | 38 | 38 | 35 | 37 | 33 | 36 | 34 |
| Cof | 0.457 | 0.364 | 0.417 | 0.407 | 0.404 | 0.389 | 0.419 | 0.416 | 0.417 |

The addition of 40 pounds of sample per ton of recycled pulp has clear advantages. The opacity gained is better than one point at all levels. The brightness is equal at all levels. Sample number 2 and 3 show significant increases in water drop (water resistance). The Samples' coefficient of friction is increased substantially over the control.

| Example # | Blank | 80# of sample per ton of pulp | | | | | | | |
|---|---|---|---|---|---|---|---|---|---|
| | | Control | 1 | 2 | 3 | 4 | 5 | 6 | 7 |
| Brightness | 57.8 | 57.7 | 56.4 | 56.7 | 56 | 56.3 | 57.1 | 55.7 | 55.7 |
| Opacity-T | 86.6 | 91 | 91.1 | 91.4 | 91.4 | 91.1 | 90.0 | 91.6 | 90.2 |
| Water Drop | 14 | 180 | 50 | 180 | 180 | 65 | 90 | 54 | 30 |
| Mullins Burst | 5 | 2.4 | 3 | 3.1 | 2.9 | 3.3 | 2.8 | 3.5 | 4 |
| Scott Bond | 40 | 31 | 34 | 31 | 30 | 30 | 32 | 32 | 31 |
| Cof | 0.456 | 0.348 | 0.378 | 0.364 | 0.359 | 0.387 | .406 | 0.393 | 0.417 |

Doubling the amount of sample in the slurry increased the opacity to almost 5 units. The paper also showed increased water resistance especially at lower levels of tall oil rosin in the sample. The CoF of Samples 1–7 is not decreased significantly over the 40# samples, but still is substantially greater than the control.

What is claimed is:

1. A method of producing a paper with enhanced opacity comprising the steps of:

providing a pulp slurry of cellulose fibers;

adding to said slurry a composition comprising the reaction products formed from the reaction of fatty acid, diamine and rosin acid and wherein said composition further includes a surfactant; and forming said slurry into said paper.

2. Method of claim 1 wherein the diamine is an alkanoldiamine.

3. Method of claim 2 wherein the fatty acid has a carbon chain length of $C_{12}$ to $C_{18}$.

4. Method of claim 3 wherein 40 to 80% by weight of said fatty acid, 5 to 30% by weight of said rosin acid and 15 to 30% by weight of said alkanoldiamine is added.

5. Method of claim 4 further comprising adding an additional acid to obtain a pH of the composition of about 3 to 6.

6. Method of claim 5 further comprising adding a salt as a viscosity controlling agent.

7. Method of claim 6 wherein the fatty acid is stearic acid.

8. Method of claim 7 wherein the alkanoldiamine is amino ethyl ethanol amine.

9. Method of claim 8 wherein the rosin acid is a tall oil rosin acid.

10. Method of claim 4 wherein the rosin acid has an acid number of at least 140 mg of KOH/gm of sample.

11. In a paper product made from cellulose fibers, the improvement comprising said product having an opacity enhaning composition therein comprising the reaction products formed from the reaction of fatty acid, diamine and rosin acid and wherein said composition further includes a suffactant.

12. Paper product of claim 11 wherein the diamine is an alkanoldiamine.

13. Paper product of claim 12 wherein the fatty acid has a carbon chain length of $C_{12}$ to $C_{18}$.

14. Paper product of claim 13 wherein 40 to 80% by weight of said fatty acid, 5 to 30% by weight of said rosin acid and 15 to 30% by weight of said alkanoldiamine is added.

15. Paper product of claim 14 further comprising an additional acid to obtain a pH of the composition of about 3 to 6.

16. Paper product of claim 15 further comprising a salt as a viscosity controlling agent.

17. Paper product of claim 16 wherein the fatty acid is stearic acid.

18. Paper product of claim 17 wherein the alkanoldiamine is amino ethyl ethanol amine.

19. Paper product of claim 18 wherein the rosin acid is a tall oil rosin acid.

20. Paper product of claim 14 wherein the rosin acid has an acid number of at least 140 mg of KOH/gm of sample.

* * * * *